(12) United States Patent
Huang et al.

(10) Patent No.: US 9,485,017 B2
(45) Date of Patent: Nov. 1, 2016

(54) MONITORING OF OPTICAL PERFORMANCE IN AN OPTICAL DATA TRANSMISSION NETWORK

(71) Applicant: Deutsche Telekom AG, Bonn (DE)

(72) Inventors: Feng Huang, Herndon, VA (US); Peter Lothberg, Los Altos, CA (US)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/277,078

(22) Filed: May 14, 2014

(65) Prior Publication Data
US 2015/0333823 A1 Nov. 19, 2015

(51) Int. Cl.
*H04B 10/079* (2013.01)
*H04B 10/564* (2013.01)
*H04B 10/572* (2013.01)
*H04J 14/02* (2006.01)

(52) U.S. Cl.
CPC ....... *H04B 10/0795* (2013.01); *H04J 14/0227* (2013.01)

(58) Field of Classification Search
CPC .......... H04B 10/0793; H04B 10/0795; H04B 10/0797; H04B 10/0799; H04B 10/564; H04B 10/572
USPC ........................ 398/25–27, 37, 38
See application file for complete search history.

(56) References Cited

U.S. PATENT DOCUMENTS

| | | | | |
|---|---|---|---|---|
| 6,529,316 B1 * | 3/2003 | Treyz | ................. | H04B 10/0797 359/337.11 |
| 6,859,622 B1 * | 2/2005 | Jiang | ................. | H04B 10/2537 398/193 |
| 2002/0044322 A1 * | 4/2002 | Blumenthal | ........ | H04J 14/0298 398/147 |
| 2002/0054648 A1 | 5/2002 | Krummrich et al. | | |
| 2002/0163683 A1 * | 11/2002 | Antoniades | ......... | H04J 14/0221 398/26 |
| 2004/0076430 A1 * | 4/2004 | Zaacks | ............. | H04B 10/07953 398/27 |
| 2004/0223769 A1 * | 11/2004 | Hoshida | ........... | H04B 10/07955 398/188 |
| 2005/0123295 A1 * | 6/2005 | Hullin | ................. | H04J 14/0221 398/25 |
| 2005/0232631 A1 * | 10/2005 | Look | ................ | H04B 10/07951 398/58 |
| 2009/0214212 A1 | 8/2009 | Vorbeck et al. | | |
| 2009/0279888 A1 * | 11/2009 | Butler | ................. | H04J 14/0221 398/37 |
| 2014/0147113 A1 * | 5/2014 | Auge | .................. | H04B 10/2935 398/26 |
| 2015/0215032 A1 * | 7/2015 | Bevilacqua | ......... | H04J 14/0267 398/5 |

FOREIGN PATENT DOCUMENTS

EP 2053771 A1 4/2009

\* cited by examiner

*Primary Examiner* — Dalzid Singh
(74) *Attorney, Agent, or Firm* — Leydig, Voit & Mayer, Ltd.

(57) ABSTRACT

A method for monitoring optical performance in an optical data transmission network, the optical data transmission network including a first router node, a second router node, and an optical data transmission line connecting the first router node with the second router node providing optical data transmission from the first router node to the second router node using at least two channels, includes: in a measurement step, determining, at the spare IP router interface, optical performance parameters of the at least two channels; in a transmission step subsequent to the measurement step, transmitting the determined optical performance parameters to a remote control unit; and in an analysis step subsequent to the transmission step, analyzing the transmitted optical performance parameters and determining whether to take a corrective action to improve optical performance of the at least two channels.

17 Claims, 1 Drawing Sheet

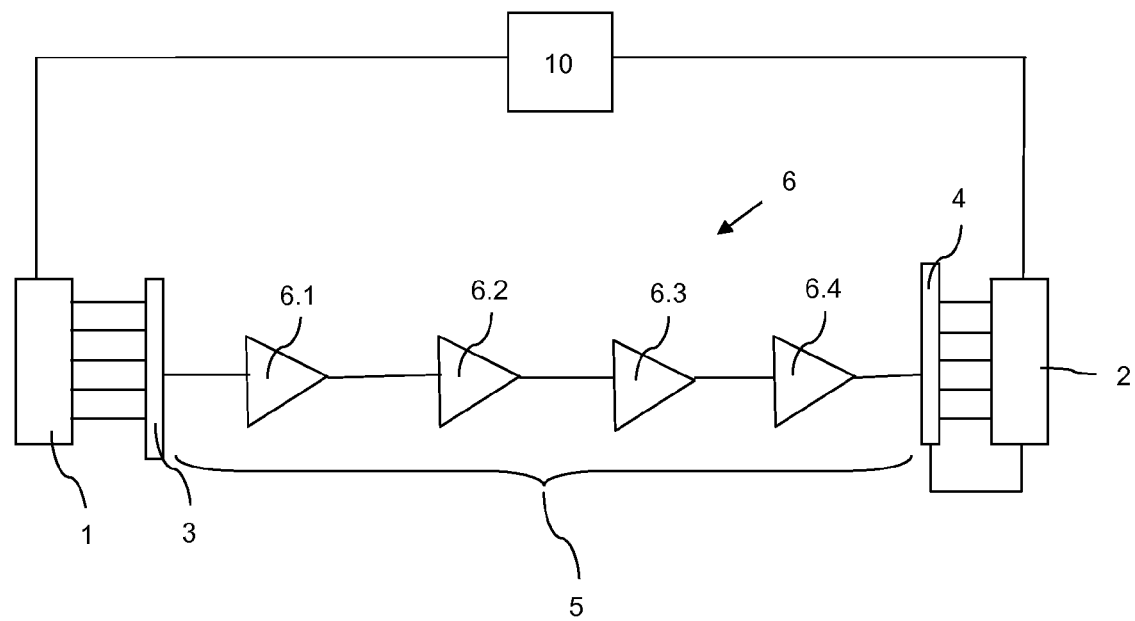

MONITORING OF OPTICAL PERFORMANCE IN AN OPTICAL DATA TRANSMISSION NETWORK

FIELD

The present invention relates to a method for monitoring optical performance in an optical data transmission network, wherein the optical data transmission network comprises at least a first router node, a second router node and an optical data transmission line connecting the first router node with the second router node providing optical data transmission from the first router node to the second router node using at least two channels, each using a predetermined wavelength, wherein the optical data transmission network comprises a multitude of amplifier nodes arranged in series along the optical data transmission line between the first router node and the second router node.

The invention further relates to an optical data transmission network, comprising at least a first router node, a second router node and an optical data transmission line connecting the first router node with the second router node providing optical data transmission from the first router node to the second router node using at least two channels, each using a predetermined wavelength, wherein the optical data transmission network comprises a multitude of amplifier nodes arranged in series along the optical data transmission line between the first router node and the second router node.

BACKGROUND

Advanced telecommunications networks that are able to deliver higher bandwidths to fixed and/or mobile subscribers require access networks, aggregation networks and core networks that have increased bandwidths. Such increased bandwidth needs can be handled by optical transport networks or optical data transmission networks, especially those using at least two channels, each using a predetermined wavelength, in particular according to a wavelength division multiplex (WDM) scheme or a dense wavelength division multiplex (DWDM) scheme.

In optical data transmission networks, router nodes typically are connected via optical data transmission lines that comprise a series of amplifier nodes arranged one after another. In order to monitor the optical performance of the amplifier nodes, it is necessary to carry out measurements locally at the amplifier nodes. For example, a technician would tap an optical spectrum analyzer onto the monitor port of an amplifier node to check the operational status of the amplifier node in question. However, this approach is rather time consuming, labor intensive and expensive.

SUMMARY

In an embodiment, the invention provides a method for monitoring optical performance in an optical data transmission network. The optical data transmission network includes a first router node, a second router node, and an optical data transmission line connecting the first router node with the second router node providing optical data transmission from the first router node to the second router node using at least two channels, each of the at least two channels using a predetermined wavelength. The optical data transmission network includes a plurality of amplifier nodes arranged in series along the optical data transmission line between the first router node and the second router node. The second router node is configured to provide a monitoring functionality using a spare IP router interface. The method includes: in a measurement step, determining, at the spare IP router interface, optical performance parameters of the at least two channels; in a transmission step subsequent to the measurement step, transmitting the determined optical performance parameters to a remote control unit; and in an analysis step subsequent to the transmission step, analyzing the transmitted optical performance parameters and determining whether to take a corrective action to improve optical performance of the at least two channels.

BRIEF DESCRIPTION OF THE DRAWING

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 is a schematic block diagram of an optical data transmission network in accordance with the present invention.

DETAILED DESCRIPTION

Embodiments of the invention provide an optical data transmission network and a method for monitoring optical performance in such an optical data transmission network that enables less time-consuming, technically simple and cost effective monitoring of the optical performance.

In an embodiment, a method is provided for monitoring optical performance in an optical data transmission network, wherein the optical data transmission network comprises at least a first router node, a second router node and an optical data transmission line connecting the first router node with the second router node providing optical data transmission from the first router node to the second router node using at least two channels, each using a predetermined wavelength, wherein the optical data transmission network comprises a multitude of amplifier nodes arranged in series along the optical data transmission line between the first router node and the second router node, wherein the second router node comprises a monitoring functionality using a spare IP router interface, and wherein the method comprises the following steps:
  in a measurement step, optical performance parameters of the at least two channels are provided at the spare IP router interface,
  in a transmission step, subsequent to the measurement step, optical performance parameters are transmitted to a remote control unit,
  in an analysis step, subsequent to the transmission step, optical performance parameters are analyzed and it is determined whether a corrective action is necessary to improve optical performance of the at least two channels.

According to the present invention, the optical data transmission network comprises at least a first router node and a second router node, between the first and second router node an optical data transmission line, and furthermore a multitude of amplifier nodes arranged in series, i.e. one after the other, along the optical data transmission line between the first and second router node. The present invention relies on an optical data transmission line providing optical data transmission from the first router node to the second router node . . . that is to say unidirectional data transmission from the first router node to the second router node. Generally optical data transmission networks comprise optical data transmission lines that provide bidirectional optical data transmission and therefore are capable of transmitting data from the first router node to the second router node and vice versa. Typically, the optical data transmission network comprises besides the first and second router node further router nodes, and besides the optical data transmission line (between the first and second router node) further optical data transmission lines and/or non-optical data transmission lines (such as, e.g., data transmission lines carrying electrical signals or even wireless data transmission lines) connecting the other router nodes (besides the first and second router nodes). Furthermore, it is typical for core networks or aggregation networks (comprising at least partially optical data transmission components or being at least in part optical data transmission networks) that router nodes of different levels exist, such as router nodes of a first (lower) level, and router nodes of a second (higher) level. However, in the context of the present invention, the (same or different) level of two router nodes that are connected by an optical data transmission line is not primarily relevant for the inventive functionality of the optical data transmission network or the functionality of the optical data transmission line with respect monitoring of optical performance.

The optical data transmission network according to the present invention or used in accordance with the inventive method preferably uses a wavelength division multiplex (WDM) scheme or a dense wavelength division multiplex (DWDM) scheme. This means that a multitude of different (optical) data transmission wavelengths are used within the optical data transmission line, especially within a fiber of the optical data transmission line.

According to the present invention optical performance parameters of the at least two channels are provided at the spare IP router interface. It is not required to employ additional measurement appliances or to integrate additional measurement facilities into the second router node. Based on these optical performance parameters obtained by the monitoring functionality of the second router node conclusions may be drawn on the optical performance of the amplifier nodes in between the first and second router node. Therefore, it is not required to measure optical performance parameters, in particular optical power levels, at the amplifier nodes. Optical performance of the network can be monitored in a less time-consuming, technically simple and cost effective manner. According to the present invention the measured optical performance parameters are transmitted to a remote control unit, in particular a remote computer. By transmitting the measurement results to a control unit remotely located from the router nodes and/or the amplifier nodes monitoring of the optical performance is simplified. A technician is not required to visit the site of the router node to obtain measurement values. Furthermore, optical performance parameters are analyzed and it is determined whether a corrective action is necessary to improve optical performance of the at least two channels. Analysis of the optical performance parameters as well as determination of corrective actions can preferably be carried out by the remote control unit.

Preferably, the optical performance parameters of the at least two channels provided by the monitor interface comprise at least one of optical receive power levels, optical signal-to-noise ratio (OSNR), polarization mode dispersion (PMD), chromatic dispersion (CD) and forward error correction (FEC) performance. The optical performance parameters can be obtained for each of the at least two channels, in particular by setting the wavelength of the spare IP router interface to each of the wavelengths corresponding to the at least two channels. Advantageously, the transmitting power of the spare IP router interface is turned off to avoid interference to other channels.

Furthermore, it is preferred according to the present invention that the first router node and the second router node are controlled by a software program running on the remote control unit, in particular a remote computer, connected to the first router node and the second router node. When the first and second router nodes are controlled by software running a remote control unit, direct communication between the first router node and the second router node is not required.

The inventive method can advantageously be applied for balancing optical channel power in an optical data transmission network as will be described in the following.

It is preferred according to the present invention that the analysis step comprises determining the minimum optical receive power level as well as the corresponding minimum optical receive power channel of the at least two channels, and determining a receive power range indicative of the distribution of the optical receive power levels of the at least two channels. The receive power range can be calculated by determining the difference between the minimum optical receive power level and a value representative of the distribution of the measured receive power levels, e.g. the average receive power level or the maximum receive power level. Alternatively, the receive power range can be calculated as a deviation from the average receive power, e.g. the standard deviation.

According to the invention it is further preferred that the analysis step further comprises comparing the receive power range to a predetermined range limit. For example, the predetermined range limit may be set to a value below 6 dB, preferably to 4 dB.

Thereby, it is preferred according to the present invention that, in case that it is determined that the receive power range exceeds the range limit, in a correction step, subsequent to the analysis step, the corrective action is carried out, wherein the transmit power of the first router node is increased for the minimum optical receive power channel and the transmit power of the first router node is decreased for other channels. By increasing the transmit power of the first router node for the channel identified as showing a low receive power level at the second router node, the receive power for the channel in question can be adapted to the receive power of the remaining channels. By simultaneously decreasing the transmit power of the other channels, preferably of all other channels, the time needed for adjustment can be reduced. Advantageously, the amount of decrement is chosen so that it would not create a receive power range larger than the predetermined range limit.

According to a preferred embodiment of the present invention, the measurement step, the transmission step, the analysis step and, if applicable, the correction step are iteratively repeated until the optical receive power range is lower than the predetermined range limit. By iteratively repeating the method, receive power range can be stepwise reduced down to a value that is below the predetermined range limit. Preferably, the number of iterations is counted and checked against a predetermined iteration limit, e.g. 5 iterations or 10 iterations or 20 iterations. Still preferably, if the predetermined iteration limit is reached, iteratively repeating the aforementioned steps is stopped.

Alternatively, the inventive method can be used for analyzing failures appearing at the optical data transmission line, in particular failures that are related to the amplifier nodes. This will be described in the following.

It is preferred that, the analysis step comprises computing estimated optical output power levels at the outputs of the amplifier nodes for the at least two channels taking into account measured optical receive power levels, predetermined amplifier node gain values and predetermined transmission losses. As the amplifier node gain as well as the losses attributed to fiber span and/or splitter insertion and/or patch cords are well known, it is possible to estimate optical output power values at each of the amplifier nodes for all the channels. Preferably, channel-dependent amplifier gain and/or channel-dependent losses, e.g. attributed to fiber dispersion, can be taken into consideration.

Advantageously, the analysis step further comprises computing theoretical optical output power levels at the outputs of the amplifier nodes for the at least two channels taking into account predetermined optical transmit power levels, predetermined amplifier node gain values and predetermined transmission losses. The theoretical optical output power levels for the amplifier nodes can be derived from system specifications.

According to a preferred embodiment of the invention, the analysis step comprises determining whether the corrective action is necessary for all channels or an individual channel or a subgroup of channels. Based on the analysis of the performance parameters it can be determined whether there is a problem related to an individual channel or to all channels.

Furthermore, it is preferred that the analysis step comprises computing the optical output power differences between the estimated optical output power levels and the theoretical optical output power levels and comparing the optical output power differences to a predetermined difference limit. Preferably, it can be determined, if just a single channel shows increased output power differences, which is considered as a problem related to the individual channel, or if more than one channel shows increased output power differences, which is considered as a problem related to a multitude of channels. Individual channel related problems can be solved by adjusting the transmit power of the first router node or by renewing the patch cord connections unique to that channel. As the amplifiers usually show an amplification characteristic which is constant over the wavelength used for optical data transmission in the optical data transmission network, increasing the gain of one of the amplifier nodes helps against problems related to a multitude of channels or related to all of the channels.

It is further preferred that the method further comprises a correction step, subsequent to the analysis step, wherein, as the corrective action, the gain of one of the amplifier nodes is adjusted.

According to a preferred embodiment of the present invention, the measurement step, the transmission step and the analysis step are iteratively repeated and the gain of the amplifier nodes is varied in each iteration loop in order to localize failures along the optical data transmission line. For example, for each iteration loop one of the amplifier nodes is selected and its gain value is set to deviate from the predetermined value. Thereby, it is possible to determine whether the gain of certain amplifier nodes needs to be adjusted to improve optical performance and it is possible to localize failures along the optical data transmission line.

It is further preferred according to the invention when the optical receive power levels of the at least two channels are compared to a predetermined receive power threshold and the total number of channels that exceed the receive power threshold is determined. By counting the number of channels exceeding the receive power threshold, the number of active channels can be determined. This value can be used to estimate the total optical output power at each of the amplifier nodes.

The invention furthermore relates to an optical data transmission network, comprising at least a first router node, a second router node and an optical data transmission line connecting the first router node with the second router node providing optical data transmission from the first router node to the second router node using at least two channels, each using a predetermined wavelength, wherein the optical data transmission network comprises a multitude of amplifier nodes arranged in series along the optical data transmission line between the first router node and the second router node, wherein the second router node comprises a monitoring functionality using a spare IP router interface, and wherein the optical data transmission network is configured such that:

in a measurement step, optical performance parameters of the at least two channels are provided at the spare IP router interface, in a transmission step, subsequent to the measurement step, optical performance parameters are transmitted to a remote control unit, in an analysis step, subsequent to the transmission step, optical performance parameters are analyzed and it is determined whether a corrective action is necessary to improve optical performance of the at least two channels.

According to the present invention it is preferred that the optical data transmission network comprises a coupler arranged between the first router node and the amplifier nodes.

Advantageously, the optical data transmission network comprises a splitter arranged between the amplifier nodes and the second router node.

Additionally the present invention relates to a program comprising a computer readable program code which, when executed on a computer or on a control unit or on a router node, causes the computer or control unit or router node to perform the inventive method.

Still additionally, the present invention relates to a computer program product comprising a computer program stored on a storage medium, the computer program comprising program code which, when executed on a computer or on a control unit or on a router node, causes the computer or control unit or router node to perform the inventive method.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, an optical data transmission network is depicted, comprising an optical data transmission line 5, a first router node 1 and a second router node 2. Along the optical data transmission line 5, a multitude of amplifier nodes are located that are used to refresh the optical signal transmitted on the optical data transmission line 5. The multitude of amplifier nodes are hereinafter, as a whole, designated by reference sign 6. Specifically, according to a direction of the optical data transmission line 5 starting from the first router node 1, a first amplifier node 6.1 is located nearest to the first router node 1. Successively along the optical data transmission line 5 (in the direction away from the first router node 1), a second amplifier node 6.2 is located after the first amplifier node 6.1, a third amplifier node 6.3 is located after the second amplifier node 6.2, and a fourth amplifier node 6.4 is located after the third amplifier node 6.3. The fourth amplifier node 6.4 is connected to the second router node 2.

In the optical data transmission network data is transmitted from the first router node 1 over the optical data transmission line 5 to the second router node 2. The data transmission is therefore directed from the first router node 1 towards the second router node 2.

The optical data transmission network uses a wavelength division multiplex (WDM) scheme or a dense wavelength division multiplex (DWDM) scheme for optical data transmission. This means that each channel uses a separate wavelength for transmission. Within the optical data transmission network depicted in FIG. 1 a multitude of channels is used for optical data transmission between the first router node 1 and the second router node 2.

In between the first router node 1 and the optical data transmission line 5 a coupler 3 is arranged. Using the coupler 3 it is possible to multiplex a multitude of channels provided on separate fibers connected to the first router node 1 onto the optical data transmission line 5. In between the optical network 5 and the second router node 2 a splitter 4 is arranged. Using the splitter 4 it is possible to demultiplex a multitude of channels from the optical data transmission line 5 onto several separate fibers connected to the second router node 2.

The second router node 2 comprises a monitoring functionality using a spare IP router interface. The spare IP router interface can be an integrated DWDM interface, preferably with tunable lasers. At the spare IP router interface wavelength-selective measurements results of the optical receive power level, optical signal to noise ratio (OSNR), polarization mode dispersion (PMD), chromatic dispersion (CD) and forward error correction (FEC) performance and further performance parameters are provided. Optionally, the first router node 1 could feature a monitoring functionality using a spare IP router interface as well.

The optical data transmission network further comprises a control unit 10 that is arranged remote from the amplifier nodes 4 and the first and second router nodes 1, 2. Preferably, the control unit 10 is configured to receive the optical performance parameters measured by the second router node 2. The remote control unit 10 is preferably programmable. The remote control unit 10 can be a computer. Advantageously, the control unit 10 is running a software program, controlling the first router node 1 and the second router node 2. The remote control unit 10 analyzes the optical performance parameters and determines whether a corrective action is necessary to improve optical performance of the at least two channels.

Using the remote control unit 10 the inventive method is executed comprising the following steps:
- in a measurement step, optical performance parameters of the at least two channels are provided at the spare IP router interface,
- in a transmission step, subsequent to the measurement step, optical performance parameters are transmitted to the remote control unit 10,
- in an analysis step, subsequent to the transmission step, optical performance parameters are analyzed and it is determined whether a corrective action is necessary to improve optical performance of the at least two channels.

In order to avoid interference, the optical transmitter of the spare IP router interface of router node 2 is preferably switched off.

Preferably the inventive method may be used for automatically controlling channel power in an optical path. It is always desirable to equalize optical channel power in an optical data transmission network for the sake of better performance and higher efficiency. For automatic control of the channel power the following steps are conducted.

As part of the analysis step the minimum optical receive power level as well as the corresponding minimum optical receive power channel of the at least two channels is determined. The minimum optical receive power channel is corresponding to a so called problem wavelength, for which the optical data transmission line shows the smallest optical receive power level. Furthermore, a receive power range indicative of the distribution of the optical receive power levels of the at least two channels is determined. This could be for example done be computing the difference of the maximum optical receive power level and the minimum optical receive power level. However, there are alternative methods available for determining the receive power range, like e.g. computing variance, standard deviation or another dispersion measure.

As a further part of the analysis step, the receive power range is compared to a predetermined range limit. For example, the predetermined range limit may be set to a value below 6 dB, preferably to 4 dB.

If the receive power range exceeds the range limit—in a correction step subsequent to the analysis step—the transmit power of the first router node 1 for the minimum optical receive power channel is increased and the transmit power of the first router node 1 for other channels is decreased. As the transmit power of the first router for the channel identified as showing the lowest receive power level at the second router node is increased, the receive power for the channel in question can be adapted to the receive power levels of the remaining channels. By simultaneously decreasing the transmit power of the other channels, preferably of all other channels, the time needed for equalizing the channels can be reduced. Advantageously, the amount of decrement is chosen so that it would not create a receive power range larger than the predetermined range limit.

The measurement step, the transmission step, the analysis step and, if applicable, the correction step can be iteratively repeated until the optical receive power range is lower than the predetermined range limit. Thereby, the receive power level for all channels of the optical data transmission link 5 can be automatically equalized.

The amplifier nodes 6 are preferably not involved in the procedure explained before, because the amplifier nodes 6 are supposed to amplify the power level of all channels/wavelength equally. In other words the amplifier nodes 6 show a constant frequency response for the relevant wavelengths of the optical data transmission link 5. Therefore changing the amplification gain of certain amplifier nodes 6 would not significantly attribute to wavelength selective adjustment of the receive power levels measured at the second router node 2.

Alternatively the inventive method can be used to remotely monitor the operational status of the amplifier nodes 6. Based on the measured optical receive power levels, estimated optical output power levels at the outputs of the amplifier nodes may be computed for the at least two channels taking into account predetermined amplifier node gain values and predetermined transmission losses. For example the optical output power level Pout at the amplifier node 6.4 can be estimated from the measured optical receive power level P2 at router node 2 for a predetermined channel/wavelength as follows:

$$P\text{out} = P2 - L,$$

where L means the total losses on path between amplifier node 6.4 and second router node 2. The total loss preferably includes losses due to fiber span, splitter insertion and patch cords. When the gain G of amplifier node 6.4 is known, the input power level Pin at amplifier node 6.4 can be estimated to be $$P\text{in} = P\text{out}/\text{gain}.$$

Furthermore, based on predetermined optical transmit power levels, theoretical optical output power levels at the outputs of the amplifier nodes 6 can be computed for the at least two channels taking into account predetermined amplifier node gain values and predetermined transmission losses. The theoretical optical output power levels for the amplifier nodes 6 can be derived from system specifications.

For evaluating the performance of the amplifier nodes 6 the optical output power differences between the estimated optical output power levels and the theoretical optical output power levels may be computed. Furthermore, the optical output power differences can be compared to a predetermined difference limit.

It is possible to determine whether there is a problem for an individual channel of the optical data transmission link 5 or if the problem is related to all channels of the optical data transmission link 5.

Thereby, it is possible to determine whether the gain of certain amplifier nodes 6 needs to be adjusted to improve optical performance. In order to improve the amplifier node performance appropriate counteractive measures can be taken. For example, if for a given channel/wavelength at least one optical output power difference exceeds the maximum output power difference limit, the gain of one of the amplifier nodes 6, e.g. amplifier node 6.4 can be increased.

Optionally, the measurement step, the transmission step and the analysis step are iteratively repeated and the gain of the amplifier nodes is varied in each iteration loop in order to localize failures along the optical data transmission line. For example, in a first iteration loop the first amplifier node 6.1 is selected and its gain is set to deviate from the predetermined value. The measurement step, the transmission step and the analysis step are carried out. In the second iteration loop the gain of the first amplifier node 6.1 is set back to its original value and the gain of the second amplifier node 6.2 is set to deviate from the predetermined value. This procedure is carried out so as to vary the gain of all amplifier nodes 6. By comparing the results obtained for the different iterations it is possible to localize failures along the optical data transmission line.

Still alternatively the inventive method may be applied to count the number of active channels. For counting the number of active channels the following steps are conducted. The optical receive power levels of the at least two channels are compared to a predetermined receive power threshold and the total number of channels that exceed the receive power threshold is determined.

With the number of active channels N determined, it is possible to estimate the total optical output power Ptotal at each of the amplifier nodes 6. The estimation formula is $$P\text{total} = P\text{channel} + 10 \log N,$$

where Pchannel is the output power per channel, which is a known design parameter.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for monitoring optical performance in an optical data transmission network, wherein the optical data transmission network comprises a first router node, a second router node, and an optical data transmission line connecting the first router node with the second router node providing optical data transmission from the first router node to the second router node using at least two channels, each of the at least two channels using a predetermined wavelength, wherein the optical data transmission network comprises a plurality of amplifier nodes arranged in series along the optical data transmission line between the first router node and the second router node, wherein the second router node comprises a spare IP router interface, and wherein the method comprises:

in a measurement step, determining, at the spare IP router interface, optical performance parameters of the at least two channels;

in a transmission step subsequent to the measurement step, transmitting the determined optical performance parameters to a remote control unit; and in an analysis step subsequent to the transmission step, analyzing the transmitted optical performance parameters and determining whether to take a corrective action to improve optical performance of the at least two channels;

wherein the analysis step further comprises:

determining a minimum optical receive power level as well as a corresponding minimum optical receive power channel of the at least two channels, and determining a receive power range indicative of the distribution of the optical receive power levels of the at least two channels.

2. The method according to claim 1, wherein the optical performance parameters of the at least two channels comprise at least one of the group consisting of optical receive power levels, optical signal-to-noise ratio (OSNR), polarization mode dispersion (PMD), chromatic dispersion (CD) and forward error correction (FEC) performance.

3. The method according to claim 1, wherein the first router node and the second router node are controlled by a software program running on the remote control unit connected to the first router node and the second router node.

4. The method according to claim 1, wherein the analysis step comprises comparing the receive power range to a predetermined range limit.

5. The method according to claim 4, wherein, in the case that it is determined that the receive power range exceeds the predetermined range limit, the method further comprises:

in a correction step subsequent to the analysis step, the corrective action is carried out, wherein the transmit power of the first router node is increased for the minimum optical receive power channel and the transmit power of the first router node is decreased for other channels.

6. The method according to claim 5, wherein the measurement step, the transmission step, the analysis step and, if applicable, the correction step are iteratively repeated until the optical receive power range is lower than the predetermined range limit.

7. A method for monitoring optical performance in an optical data transmission network, wherein the optical data transmission network comprises a first router node, a second router node, and an optical data transmission line connecting the first router node with the second router node providing optical data transmission from the first router node to the second router node using at least two channels, each of the at least two channels using a predetermined wavelength, wherein the optical data transmission network comprises a plurality of amplifier nodes arranged in series along the optical data transmission line between the first router node and the second router node, wherein the second router node comprises a spare IP router interface, and wherein the method comprises:

in a measurement step, determining, at the spare IP router interface, optical performance parameters of the at least two channels;

in a transmission step subsequent to the measurement step, transmitting the determined optical performance parameters to a remote control unit; and in an analysis step subsequent to the transmission step, analyzing the transmitted optical performance parameters and determining whether to take a corrective action to improve optical performance of the at least two channels;

wherein the analysis step comprises computing estimated optical output power levels at the outputs of the amplifier nodes for the at least two channels taking into account measured optical receive power levels, predetermined amplifier node gain values and predetermined transmission losses.

8. The method according to claim 7, wherein the analysis step comprises computing theoretical optical output power levels at the outputs of the amplifier nodes for the at least two channels taking into account predetermined optical transmit power levels, predetermined amplifier node gain values and predetermined transmission losses.

9. The method according to claim 8, wherein the analysis step comprises determining whether the corrective action is necessary for all channels or an individual channel or a subgroup of channels.

10. The method according to claim 9, wherein the analysis step comprises computing the optical output power differences between the estimated optical output power levels and the theoretical optical output power levels and comparing the optical output power differences to a predetermined difference limit.

11. The method according to claim 10, wherein the method further comprises:

in a correction step subsequent to the analysis step, adjusting the gain of one of the amplifier nodes as the corrective action.

12. A method for monitoring optical performance in an optical data transmission network, wherein the optical data transmission network comprises a first router node, a second router node, and an optical data transmission line connecting the first router node with the second router node providing optical data transmission from the first router node to the second router node using at least two channels, each of the at least two channels using a redetermined wavelength, wherein the optical data transmission network comprises a plurality of amplifier nodes arranged in series along the optical data transmission line between the first router node and the second router node, wherein the second router node comprises a spare IP router interface, and wherein the method comprises:

in a measurement step, determining, at the spare IP router interface, optical performance parameters of the at least two channels;

in a transmission step subsequent to the measurement step, transmitting the determined optical performance parameters to a remote control unit; and in an analysis step subsequent to the transmission step, analyzing the transmitted optical performance parameters and determining whether to take a corrective action to improve optical performance of the at least two channels;

wherein the measurement step, the transmission step and the analysis step are iteratively repeated and the gain of the amplifier nodes is varied in each iteration loop in order to localize failures along the optical data transmission line.

13. A method for monitoring optical performance in an optical data transmission network, wherein the optical data transmission network comprises a first router node, a second router node, and an optical data transmission line connecting the first router node with the second router node providing optical data transmission from the first router node to the second router node using at least two channels, each of the at least two channels using a predetermined wavelength, wherein the optical data transmission network comprises a plurality of amplifier nodes arranged in series along the optical data transmission line between the first router node and the second router node, wherein the second router node comprises a spare IP router interface, and wherein the method comprises:

in a measurement step, determining, at the spare IP router interface, optical performance parameters of the at least two channels;

in a transmission step subsequent to the measurement step, transmitting the determined optical performance parameters to a remote control unit; and in an analysis step subsequent to the transmission step, analyzing the transmitted optical performance parameters and determining whether to take a corrective action to improve optical performance of the at least two channels;

wherein the optical receive power levels of the at least two channels are compared to a predetermined receive power threshold and the total number of channels that exceed the receive power threshold is determined.

14. An optical data transmission network, comprising:
a first router node;
a second router node;
an optical data transmission line connecting the first router node with the second router node providing optical data transmission from the first router node to the second router node using at least two channels, each of the at least two channels using a predetermined wavelength; and
a plurality of amplifier nodes arranged in series along the optical data transmission line between the first router node and the second router node;
wherein the second router node comprises a spare IP router interface;
wherein the optical data transmission network is configured to:
in a measurement step, determine, at the spare IP router interface, optical performance parameters of the at least two channels;
in a transmission step subsequent to the measurement step, transmit the determined optical performance parameters to a remote control unit; and
in an analysis step subsequent to the transmission step, analyze the transmitted optical performance parameters and determining whether to take a corrective action to improve optical performance of the at least two channels;
wherein the analysis step further comprises:
determining a minimum optical receive power level as well as a corresponding minimum optical receive power channel of the at least two channels, and determining a receive power range indicative of the distribution of the optical receive power levels of the at least two channels.

15. The optical data transmission network according to claim 14, wherein the optical data transmission network comprises:
a coupler arranged between the first router node and the amplifier nodes.

16. The optical data transmission network according to claim 14, wherein the optical data transmission network comprises:
a splitter arranged between the amplifier nodes and the second router node.

17. One or more non-transitory, processor-readable media having processor-executable instructions stored thereon for monitoring optical performance in an optical data transmission network, wherein the optical data transmission network comprises a first router node, a second router node, and an optical data transmission line connecting the first router node with the second router node providing optical data transmission from the first router node to the second router node using at least two channels, each of the at least two channels using a predetermined wavelength, wherein the optical data transmission network comprises a plurality of amplifier nodes arranged in series along the optical data transmission line between the first router node and the second router node, wherein the second router node comprises a spare IP router interface, and wherein processor-executable instructions, when executed, cause the following steps to be performed:

in a measurement step, determining, at the spare IP router interface, optical performance parameters of the at least two channels;

in a transmission step subsequent to the measurement step, transmitting the determined optical performance parameters to a remote control unit; and in an analysis step subsequent to the transmission step, analyzing the transmitted optical performance parameters and determining whether to take a corrective action to improve optical performance of the at least two channels;

wherein the analysis step further comprises:
determining a minimum optical receive power level as well as a corresponding minimum optical receive power channel of the at least two channels, and determining a receive power range indicative of the distribution of the optical receive power levels of the at least two channels.

* * * * *